United States Patent [19]

Mayumi et al.

[11] 4,243,457
[45] Jan. 6, 1981

[54] METHOD OF MOLDING PIPE JOINTS OF REINFORCED RESIN

[75] Inventors: Masakatsu Mayumi, Osaka; Kenji Mitooka; Sigeharu Fujiwara, both of Okayama, all of Japan

[73] Assignee: Sekisui Kagaku Kogyo Kabushiki Kaisha, Osaka, Japan

[21] Appl. No.: 938,100

[22] Filed: Aug. 30, 1978

[30] Foreign Application Priority Data

Sep. 2, 1977 [JP] Japan ................. 52-106058
Sep. 19, 1977 [JP] Japan ............. 52-126434[U]
Dec. 1, 1977 [JP] Japan ................. 52-144796

[51] Int. Cl.³ ............................................. B32B 33/00
[52] U.S. Cl. ................................... 156/245; 264/228; 285/423
[58] Field of Search ............... 156/172, 173, 187, 189, 156/191, 193, 242, 245, 293, 294; 285/423; 264/228

[56] References Cited

U.S. PATENT DOCUMENTS

| Re. 27,061 | 2/1971 | Rubenstein | 156/172 |
| 3,654,018 | 4/1972 | Bogue et al. | 156/245 |
| 3,888,712 | 6/1975 | Akiyoshi et al. | 156/173 |

FOREIGN PATENT DOCUMENTS 52-13822  4/1977  Japan .

Primary Examiner—Caleb Weston
Attorney, Agent, or Firm—Wenderoth, Lind & Ponack

[57] ABSTRACT

A pipe joint of a reinforced resin having a structure in which the wall of at least a socket portion consists of an inside surface layer composed of a cured product of a reinforced resin molding material, an outside surface layer composed of a cured product of a reinforced resin molding material, and an interlayer between these layers composed of a cured product of a resin mortar. The above pipe joint can be molded by (1) forming an uncured inside surface layer composed of a resin-impregnated reinforced molding material on the peripheral surface of a core mold; (2) coating a resin mortar on the inner surface of a split mold and molding the surface of the coated resin mortar by a former having a contour substantially corresponding with that of the inside surface layer; (3) forming an incompletely cured interlayer composed of resin mortar by capping the split mold containing the molded resin mortar on the inside surface layer and removing the split mold after the curing of the resin mortar has proceeded to a certain extent; (4) forming an uncured outside surface layer composed of a resin-impregnated reinforced molding material on the peripheral surface of the incompletely cured interlayer; and (5) completing the curing of all the layers. Alternatively, a cured cylindrical structure prepared separately may be used as the inside surface layer instead of forming it in situ in the above process.

2 Claims, 8 Drawing Figures

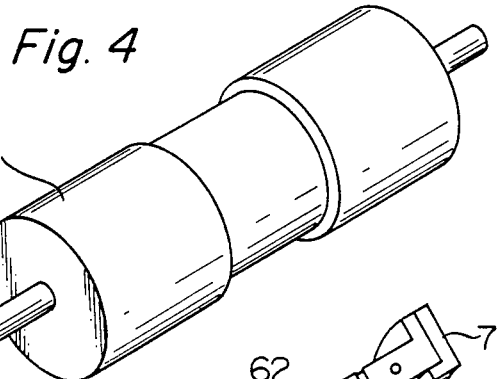
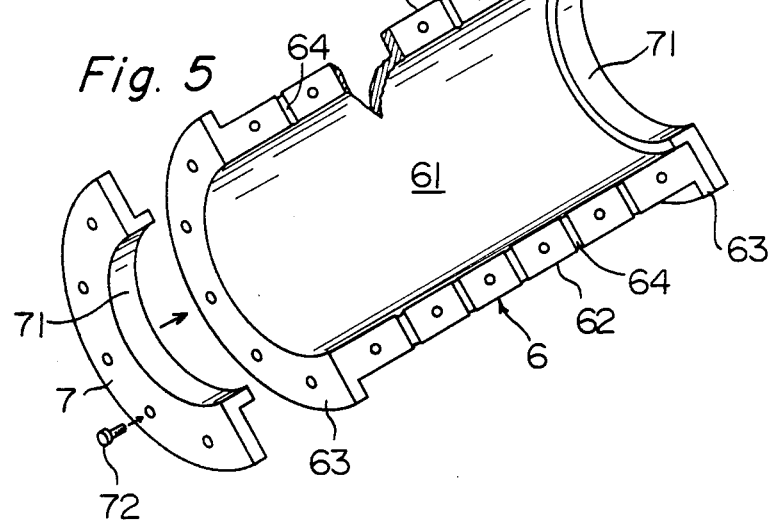
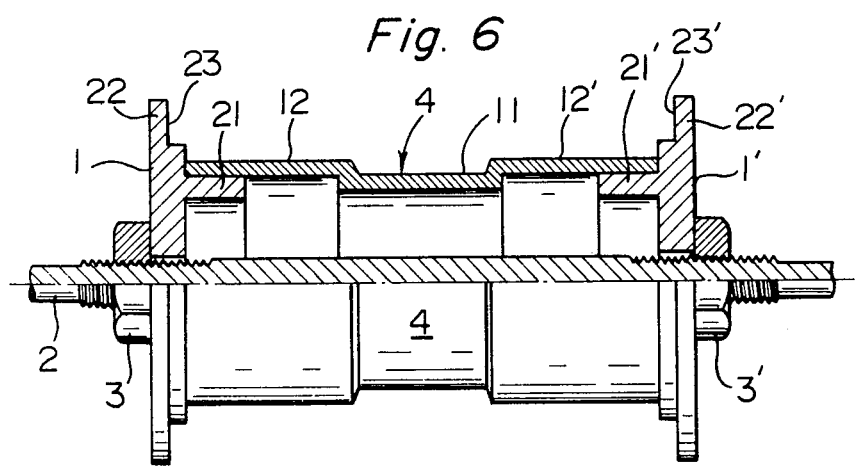

METHOD OF MOLDING PIPE JOINTS OF REINFORCED RESIN

This invention relates to a pipe joint of a reinforced resin including an interlayer composed of a resin mortar, and to a process for molding it.

In the conventional production of a reinforced resin pipe having an interlayer of a resin mortar, a method is sometimes employed, as disclosed in Japanese Patent Publication No. 13822/77, which comprises wrapping a fibrous material impregnated with a synthetic resin about a rotating mandrel and simultaneously delivering it in the direction of the axis of the mandrel thereby to form an inner layer, coating a resin mortar on the outside of the inner layer to form an interlayer, wrapping a resin-impregnated fibrous material about the outside of the interlayer, then heat-curing the entire assembly, and removing it from the mandrel. According to this method, the synthetic resin mortar tends to drop off when applied in a large amount in an attempt to obtain a thick interlayer. Furthermore, in the molding of a tubular body of a complicated shape, such as a pipe joint, it is difficult to form by this method an interlayer having a shape conforming to the desired final shape of the pipe joint from resin mortar.

It is an object of this invention therefore to remove the aforesaid defects of the conventional method.

According to this invention, a process for molding a pipe joint of a reinforced resin which comprises the following steps is provided to achieve the above object.

First embodiment (1) A step of forming an uncured inside surface layer composed of a resin-impregnated reinforced molding material on the peripheral surface of a core mold;

(2) A step of coating a resin mortar on the inner surface of a split mold and molding the surface of the coated resin mortar by a former having a contour substantially corresponding with that of the inside surface layer;

(3) A step of forming an incompletely cured interlayer composed of resin mortar by capping the split mold containing the molded resin mortar on the inside surface layer, and removing the split mold after the curing of the resin mortar has proceeded to a certain extent;

(4) A step of forming an uncured outside surface layer composed of a resin-impregnated reinforced molding material on the peripheral surface of the incompletely cured interlayer; and (5) A step of completing the curing of all the layers.

Second embodiment (1) A step of fixing a cylindrical structure composed of a cured reinforced resin material as an inside surface layer onto a support;

(2) The same step as step (2) of the first embodiment;

(3) The same step as step (3) of the first embodiment;

(4) The same step as step (4) of the first embodiment; and (5) A step of completing the curing of the interlayer and the outside surface layer.

In the accompanying drawings,

FIGS. 1 to 5 are views illustrating the entire process steps of the first embodiment of the invention, FIGS. 1 to 3 being cross-sectional views, and FIGS. 4 and 5 being perspective views;

FIG. 6 is a partially sectional side elevation illustrating step (1) of the second embodiment.

Referring to the accompanying drawings, the first embodiment of the process of the invention will be described.

Figure 1:
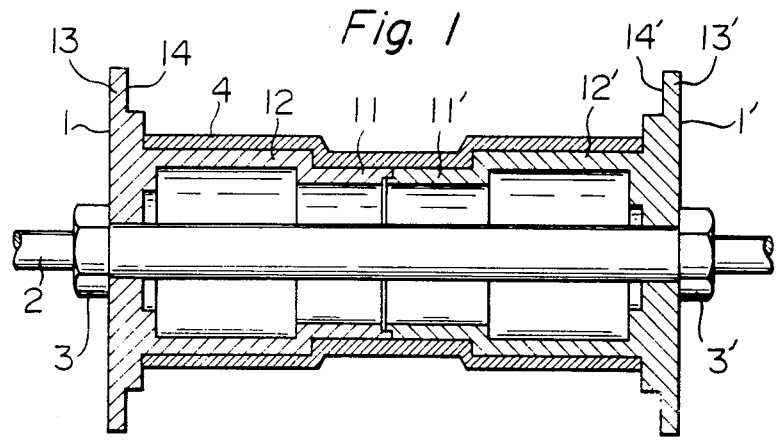

In FIG. 1, core molds 1 and 1' are assembled on a support shaft 2 by means of clamping devices 3, 3'. After molding, the molds can be removed by detaching the clamping devices 3, 3'. The core molds in their assembled state have a larger diameter at their end portions 12 and 12' than at their central portions 11 and 11' in order to form a socket portion of a coupling to be molded. Collars 13 and 13' are provided at the side end portions, and cuts 14 and 14' are formed in the circumferential direction on the inside of the peripheral edges of the collars 13 and 13'.

Around the assembled core molds 1 and 1' are wrapped a reinforced material such as a mat made of glass fibers which is impregnated with a solution containing a resin such as an unsaturated polyester and a curing agent thereby to form an inside surface layer 4.

Separately, a resin mortar made by mixing a solution of a resin such as an unsaturated polyester and a curing agent with an aggregate such as silica sand and optionally short fibers composed of glass fibers, etc. and other fillers is coated on the inner surface of split molds 6 and 6' (one member 6 is shown in FIG. 5). The surface of the resin mortar layer is molded by a former 8 (FIG. 4) having a configuration substantially conforming to the outside surface configuration of the inside surface layer 4.

Figure 2:
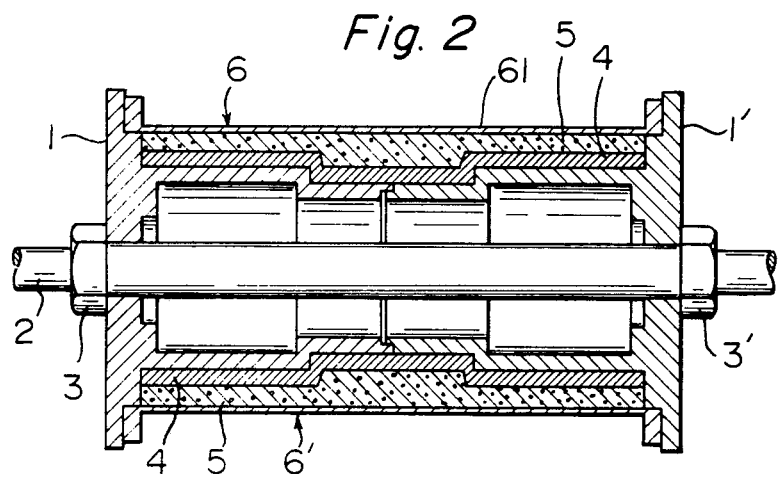

Then, as shown in FIG. 2, the split molds 6 and 6' containing the molded resin mortar are capped on the inside surface layer 4 which is still in the uncured state. After the resin mortar has cured to some extent (namely, after it has cured to such an extent that it does not substantially disintegrate even when the split molds are removed), the split molds 6 and 6' are removed to form an interlayer 5. To improve adhesion between the inside surface layer 4 and the interlayer 5, short fibers such as glass fibers may be scattered in advance on the inside surface layer 4.

Figure 3:
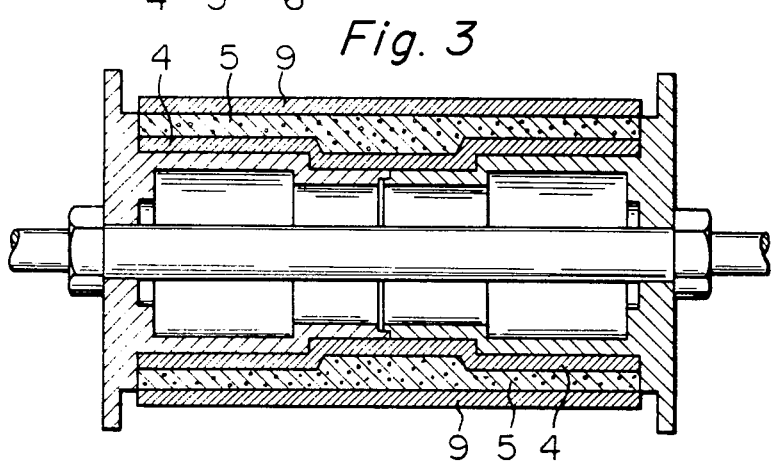

Then, as shown in FIG. 3, a reinforced material such as a mat of glass fibers impregnated with a solution containing a resin such as an unsaturated polyester resin and a curing agent is wrapped around the interlayer 5 to form an outside surface layer 9. To improve adhesion between the interlayer and the outside surface layer 9, short fibers such as glass fibers may be scattered in advance on the interlayer 5.

Subsequent curing of all the layers gives a coupling. Conveniently, the curing is performed by heating with hot air at 60° C. for 4 hours.

FIG. 5 shows one member 6 of the split molds 6 and 6'. The split mold member 6' not shown is quite the same as the member 6. The split mold 6 is composed principally of a split cylindrical body 61 split into two sections in the longitudinal direction. At both side edges of the split cylindrical body 61 are provided outwardly projecting webs 62. Discharge openings 64 (semi-cylindrical channels) leading from the inside to the outside of the split cylindrical body 61 are provided on the inner surfaces of the webs 62. Collars 63 are provided at both end portions of the split cylindrical body 61. Split rings 7 having an inner circumferential portion 71 with a smaller diameter than the inner circumferential surface of the split cylindrical body 61 are secured detachably to the collars 63 by means of stoppers 72. The resin mortar is coated on the inside surface of the split cylindrical body 61.

The former 8 shown in FIG. 4 has an outside configuration somewhat smaller than that of the inside surface layer 4 wrapped around the core molds 1 and 1'. The former 8 is urged against the resin mortar coated on the inside surface of the split cylindrical body 61, and both end portions of the former 8 are caused to abut the inner circumferential portion 71 of the split rings 7 to mark the outside surface configuration of the former 8 on the top surface of the resin mortar layer. Then, the split rings 7 are removed from the split mold 6, and the split mold 6 is capped on the inside surface layer 4 so that the resin mortar makes contact with the inside surface layer 4, as shown in FIG. 2.

Separately, a split mold 6' containing resin mortar is prepared, and as shown in FIG. 2, the split mold 6 and the split mold 6' are clamped together so that the webs of these molds may fit each other. The excess of the resin mortar is discharged from the discharge openings 64. The assembly is allowed to stand for a certain period of time in this state to cure it to some extent, and before complete curing, the split molds 6 and 6' are removed to form an interlayer 5 of resin mortar which has a larger thickness as its central portion than at its end portions.

The second embodiment of the invention will now be described with reference to the accompanying drawings.

In the first embodiment described hereinabove, the inside surface layer is formed in situ on the molds. In contrast, in the second embodiment, a cured cylindrical structure prepared separately is used as the inside surface layer.

In FIG. 6, the reference numeral 4 represents a cylindrical structure molded and cured from a reinforced molding material, which is used as the inside surface layer. Its end portions 12 and 12' are formed as socket portions in a larger diameter than its central portion 11. Although not shown in the drawings, short fibers such as glass fibers may be implanted in the surface of the cylindrical structure 4 during its molding in order to improve its adhesion to the interlayer. Furthermore, in the drawings, the reference numerals 1 and 1' represent a support for supporting the cylindrical structure 4 on a support shaft 2. Inwardly of the supports are provided cylindrical portions 21 and 21' having an outside diameter that can fit into the socket portions 12 and 12' of the cylindrical structure 4, and outwardly of the supports are fitted collars 22 and 22'. Cuts 23 and 23' are formed in the peripheral direction on the inside of the outer peripheral edges of the collars 22 and 22'. The cylindrical structure 4 is set up by fitting the cylindrical portions 21 and 21' of the supports 1 and 1' into the end portions 12 and 12' and clamping the assembly to the support shaft 2 by clamping devices 3 and 3'.

The procedure of forming an interlayer and an outside surface layer on the peripheral surface of the cylindrical structure 4 supported on the supports 1 and 1' is substantially the same as that described hereinabove with regard to the first embodiment. Specifically, a resin mortar is coated on the inside surfaces of split molds as shown in FIG. 5, and the resin mortar is molded by a former of the type shown in FIG. 4. Then, the split molds are capped on the cylindrical structure 4, and after the resin mortar has cured to some extent, the split molds are removed to form an interlayer. Then, around the interlayer is formed an outside surface layer by a resin-impregnated reinforced molding material, and finally the interlayer and the outside surface layer are cured. These procedures will be readily understood from FIGS. 2 and 3.

According to the process of this invention, whether in the first or second embodiment, the resin mortar coated on the inside surfaces of the split molds is molded to the desired contour by a former, and then used as an interlayer. Accordingly, a thicker interlayer, or an interlayer of a more complicated shape, than in the prior art, can be produced by resin mortar. In particular, in the second embodiment, the formation of the inside surface layer and the formation of the interlayer and the outside surface layer can be effected in separate independent steps. This can shorten the time during which the support (core mold) is used, and therefore, pipe joints can be produced with high productivity. Furthermore, since in the second embodiment, the inside surface layer is a cured cylindrical structure and has rigidity, it can be removed from the support immediately after forming an interlayer and an outside surface layer on it (namely, while these layers are still in the uncured state). Accordingly, a number of couplings can be formed by using a smaller number of supports.

The above embodiments have been described with regard to a coupling of reinforced resin including an interlayer composed of a cured resin mortar over its entire length. The present invention also makes it possible to produce a pipe joint having an interlayer of a cured resin mortar only at its socket openings, that is a pipe joint having the structure in which the wall of the socket portion consists of an inside surface layer which is a cured product of a reinforced resin molding material, an outside surface layer which is a cured product of a reinforced resin molding material and an interlayer which is interposed between the first two layers and is a cured product of a resin mortar. Examples of such a pipe joint are shown in FIGS. 7 and 8.

Figure 7:
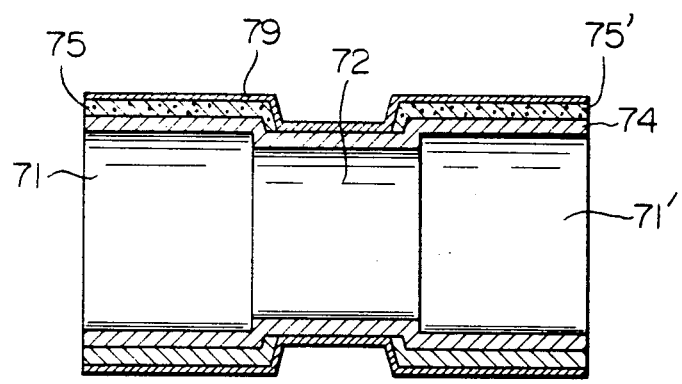
FIGS. 7 and 8 are sectional views of pipe joints having special wall structures which can be produced by the process of the invention.

In FIG. 7, the inside diameters of the socket portions 71 and 71' are larger than that of an intermediate portion 72. The reference numeral 74 represents an inside surface layer which is, for example, the one formed by the method shown in FIG. 1, or a cured cylindrical structure produced by the method shown in FIG. 6. The reference numerals 75 and 75' represent an interlayer formed from the same resin mortar as described hereinabove on the inside surface layer 74 of the socket portions 71 and 71'. The interlayers 75 and 75' are formed in accordance with the method described hereinabove with regard to FIGS. 4 and 5 by coating a resin mortar on the inner surfaces of split molds, molding the surfaces of the resin mortar layers by a former having a contour substantially conforming to the contour of the inside surface layers at the socket portions 71 and 71', capping split molds on the inside surface layer 74, and then removing the split molds. The reference numeral 79 represents an outside surface layer formed by wrapping a reinforced material such as a mat of glass fibers impregnated with a solution containing a resin such as an unsaturated polyester and a curing agent on the interlayers 75 and 75' at the socket portions 71 and 71' and the inside surface layer 74 at the intermediate portion 72. Subsequent curing of all the layers affords a coupling having a structure in which the walls at the socket portions 71 and 71' consist of the inside surface layer 74 composed of a cured product of a reinforced resin molding material, the outside surface layer 79 composed of a cured product of the same material, and interlayers 75 and 75' composed of a cured product of resin mortar which are interposed respectively between the inside and outside surface layers, and in which the wall of the intermediate portion 72 consists of the inside surface layer 74 composed of a cured product of a reinforced molding material and the outside surface layer 79 composed of a cured product of the same material.

Figure 8:
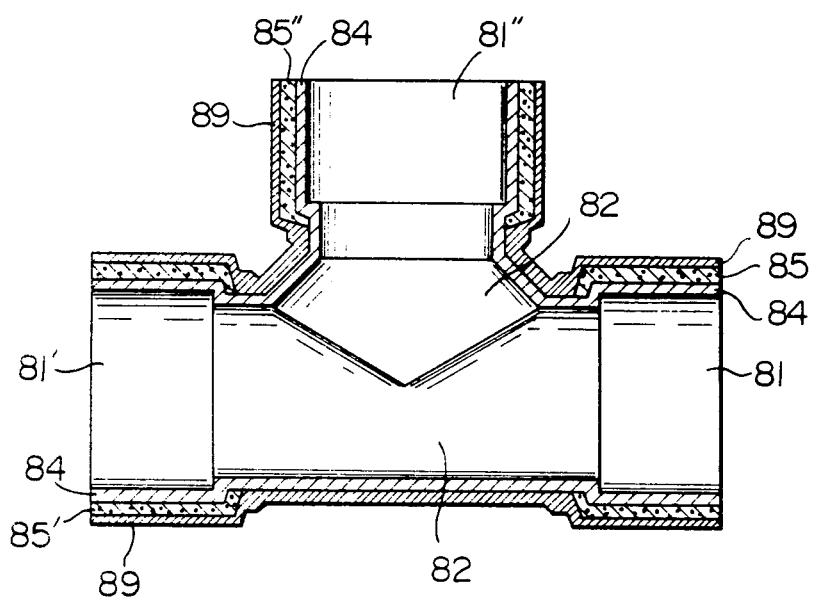

FIG. 8 shows a tees. In the drawing, the reference numeral 84 represents an inside surface layer formed in the same way as in the case of the inside surface layer 74 of the aforesaid coupling. The reference numerals 85, 85' and 85" represent interlayers formed in the same way as in the case of the interlayers 75 and 75' of the aforesaid coupling. The reference numeral 89 represents an outside surface layer formed in the same way as in the case of the outside surface layer 79 of the aforesaid coupling. Curing of all the layers affords a tees having a structure in which the walls of the socket portions 81, 81' and 81" consists of the inside surface layer 84 composed of a cured product of a reinforced resin molding material, the outside surface layer 89 composed of a cured product of the same material, and the interlayers 85, 85' and 85" composed of a cured product of resin mortar and interposed between the inside and outside surface layers, and in which the wall of the intermediate portion 82 consists of the inside surface layer 84 composed of a cured product of a reinforced resin molding material and the outside surface layer 89 composed of a cured product of the same molding material.

The pipe joints of the types shown in FIGS. 7 and 8 are such that the walls of the socket portions are of the three-layered structure consisting of inside and outside surface layers composed of a cured product of a reinforced resin molding material and an interlayer composed of a cured product of resin mortar and interposed between the first two layers. Accordingly, the socket portions of the pipe joint do not easily undergo flattening by an external load, and water leakage does not occur at a portion at which the joint is joined to a pipe. Furthermore, since the walls of the joint are made of a cured product of a reinforced resin molding material, they do not break by the internal water pressure.

What we claim is:
1. A process for molding a pipe joint of a reinforced resin, which comprises
   (1) forming an uncured inside surface layer composed of a resin-impregnated reinforced molding material on the peripheral surface of a core mold;
   (2) coating a resin mortar on the inner surface of a split mold and molding the surface of the coated resin mortar by a former having a contour substantially corresponding with that of the inside surface layer;
   (3) forming an incompletely cured interlayer composed of resin mortar by capping the split mold containing the molded resin mortar on the inside surface layer and removing the split mold after the curing of the resin mortar has proceeded to a certain extent;
   (4) forming an uncured outside surface layer composed of a resin-impregnated reinforced molding material on the peripheral surface of the incompletely cured interlayer; and
   (5) completing the curing of all the layers.
2. A process for molding a pipe joint of a reinforced resin which comprises
   (1) fixing a cylindrical structure composed of a cured reinforced resin material as an inside surface layer onto a support;
   (2) coating a resin mortar on the inner surface of a split mold and molding the surface of the coated resin mortar by a former having a contour substantially corresponding with that of the cylindrical structure;
   (3) forming an incompletely cured interlayer composed of resin mortar by capping the split mold containing the molded resin mortar on the cylindrical structure and removing the split mold after the curing of the resin mortar has proceeded to a certain extent;
   (4) forming an uncured outside surface layer composed of a resin-impregnated reinforced molding material on the peripheral surface of the incompletely cured interlayer; and
   (5) completing the curing of the interlayer and the outside surface layer.

* * * * *